US012555398B2

(12) United States Patent
Xiong et al.

(10) Patent No.: US 12,555,398 B2
(45) Date of Patent: Feb. 17, 2026

(54) INFORMATIVE USER INTERFACE FOR DOCUMENT RECOGNIZER TRAINING

(71) Applicant: Google LLC, Mountain View, CA (US)

(72) Inventors: Jing Xiong, Sunnyvale, CA (US); Tianli Yu, Mountain View, CA (US); Shengyang Dai, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 289 days.

(21) Appl. No.: 18/306,604

(22) Filed: Apr. 25, 2023

(65) Prior Publication Data

US 2024/0362940 A1   Oct. 31, 2024

(51) Int. Cl.
*G06V 30/19* (2022.01)

(52) U.S. Cl.
CPC ...... *G06V 30/1912* (2022.01); *G06V 30/1916* (2022.01)

(58) Field of Classification Search
None
See application file for complete search history.

(56) References Cited

U.S. PATENT DOCUMENTS

| 2015/0074507 A1* | 3/2015 | Riediger | G06F 16/313 |
| | | | 715/230 |
| 2022/0189150 A1* | 6/2022 | Bentaieb | G06V 10/806 |

FOREIGN PATENT DOCUMENTS

| CN | 101561805 A * | 10/2009 | |
| WO | WO-2015074071 A1 * | 5/2015 | G06F 16/00 |

OTHER PUBLICATIONS

Cazton.com, "Azure vs AWS vs GCP—Form Recognizers", 2025, https://cazton.com/blogs/technical/form-recognition-azure-aws-gcp, retrieved on Aug. 29, 2025, 15 pages.

* cited by examiner

*Primary Examiner* — Huo Long Chen
(74) *Attorney, Agent, or Firm* — DORITY & MANNING, P.A.

(57) ABSTRACT

A method includes receiving, from a user device associated with a user, a plurality of annotated documents. Each respective annotated document includes one or more fields and each respective field labeled by a respective annotation. The method includes, for a threshold number of iterations, randomly selecting a respective subset of annotated documents from the plurality of annotated documents; training a respective model on the respective subset of annotated documents; and generating, using the plurality of annotated documents not selected for the respective subset of annotated documents, a respective evaluation of the respective model. The method also includes providing, to the user device, each respective evaluation.

22 Claims, 7 Drawing Sheets

INFORMATIVE USER INTERFACE FOR DOCUMENT RECOGNIZER TRAINING

TECHNICAL FIELD

This disclosure relates to user interfaces for document recognizer training.

BACKGROUND

Entity extraction is a popular technique that identifies and extracts key information from documents (e.g., forms). Entity extraction tools generally require a user to select a template for a particular document and then the entity extraction tool will extract entities from the document using the selected template. For documents with a fixed layout, a small quantity of high-quality annotated examples is often sufficient to provide good interpretation results. For more complex documents or when using lower-quality annotated examples, a larger and/or curated quantity of annotated examples may be necessary for satisfactory results.

SUMMARY

One aspect of the disclosure provides a method for providing an informative user interface for document recognizer training. The computer-implemented method is executed by data processing hardware that causes the data processing hardware to perform operations. The operations include receiving, from a user device associated with a user, a plurality of annotated documents. Each respective annotated document of the plurality of annotated documents includes one or more fields and each respective field of the one or more fields of the respective annotated document labeled by a respective annotation. For a threshold number of iterations, the operations include randomly selecting a respective subset of annotated documents from the plurality of annotated documents; training a respective model on the respective subset of annotated documents; and generating, using the plurality of annotated documents not selected for the respective subset of annotated documents, a respective evaluation of the respective model. The operations also include providing, to the user device, each respective evaluation.

Implementations of the disclosure may include one or more of the following optional features. In some implementations, each respective evaluation includes a quantification of a quality of the respective model and the operations further include providing, to the user device, an aggregation of the quality of each respective model. In some of these implementations, the aggregation includes an average or a standard deviation of the quality.

In some examples, a quantity of annotated documents in each respective subset of annotated documents is the same. In some of these examples, the quantity of annotated documents is configurable by the user device. In some implementations, a quantity of annotated documents in a first respective subset of annotated documents is different from a quantity of annotated documents in a second respective subset of annotated documents. In some of these implementations, the operations further include providing, to the user device, a predicted evaluation for a quantity of annotated documents that exceeds a quantity of the plurality of annotated documents.

Optionally, the threshold number of iterations is configurable by the user device. Providing each respective evaluation may include generating, using each respective evaluation, a scatter plot and providing, to the user device, the scatter plot. The scatter plot may include one or more of an accuracy of each respective model, an $F_1$ score of each respective model, a precision of each respective model, or a recall of each respective model. Generating the scatter plot, in some examples, includes fitting a curve to the scatter plot. The curve indicates an additional quantity of annotated samples for the user device to provide.

Another aspect of the disclosure provides a system for providing an informative user interface for document recognizer training. The system includes data processing hardware and memory hardware in communication with the data processing hardware. The memory hardware stores instructions that when executed on the data processing hardware cause the data processing hardware to perform operations. The operations include receiving, from a user device associated with a user, a plurality of annotated documents. Each respective annotated document of the plurality of annotated documents includes one or more fields and each respective field of the one or more fields of the respective annotated document labeled by a respective annotation. For a threshold number of iterations, the operations include randomly selecting a respective subset of annotated documents from the plurality of annotated documents; training a respective model on the respective subset of annotated documents; and generating, using the plurality of annotated documents not selected for the respective subset of annotated documents, a respective evaluation of the respective model. The operations also include providing, to the user device, each respective evaluation.

This aspect may include one or more of the following optional features. In some implementations, each respective evaluation includes a quantification of a quality of the respective model and the operations further include providing, to the user device, an aggregation of the quality of each respective model. In some of these implementations, the aggregation includes an average or a standard deviation of the quality.

In some examples, a quantity of annotated documents in each respective subset of annotated documents is the same. In some of these examples, the quantity of annotated documents is configurable by the user device. In some implementations, a quantity of annotated documents in a first respective subset of annotated documents is different from a quantity of annotated documents in a second respective subset of annotated documents. In some of these implementations, the operations further include providing, to the user device, a predicted evaluation for a quantity of annotated documents that exceeds a quantity of the plurality of annotated documents.

Optionally, the threshold number of iterations is configurable by the user device. Providing each respective evaluation may include generating, using each respective evaluation, a scatter plot and providing, to the user device, the scatter plot. The scatter plot may include one or more of an accuracy of each respective model, an $F_1$ score of each respective model, a precision of each respective model, or a recall of each respective model. Generating the scatter plot, in some examples, includes fitting a curve to the scatter plot. The curve indicates an additional quantity of annotated samples for the user device to provide.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Entity extraction is a popular technique that identifies and extracts key information from documents (e.g., forms). Entity extraction tools generally require a user to select a template for a particular document and then the entity extraction tool will extract entities from the document using the selected template. Entity extraction often makes use of document artificial intelligence (AI) to extract the data from digital or handwritten custom forms, invoices, tables, receipts, etc.

For documents with a fixed layout, a small number of annotated examples may be sufficient to provide good interpretation results. However, conventional techniques do not provide users enough information or feedback on how to maximize the use of limited labeled ground truth data. For example, existing interfaces do not provide users information regarding the quality of submitted annotated examples, such as an amount of variability in the examples, or whether increasing the quantity of examples will substantively affect the quality of the model. Due to the cost of both time and resources in training accurate models, providing feedback on the annotated documents (i.e., the training samples) prior to committing to full training of a model is advantageous. Moreover, such feedback would allow a user to curate the training samples to enable the training of more accurate models.

Implementations herein are directed toward a document evaluator that receives annotated documents from a user and evaluates the annotated documents with respect to training one or more extraction models. The document evaluator may train multiple models with different random samplings of the provided annotated documents to provide the user with an understanding of a quality and/or variability of the provided annotated documents. In some examples, the document evaluator estimates or predicts an impact on trained extraction models if the user were to provide additional annotated documents (i.e., additional training examples).

Figure 1:
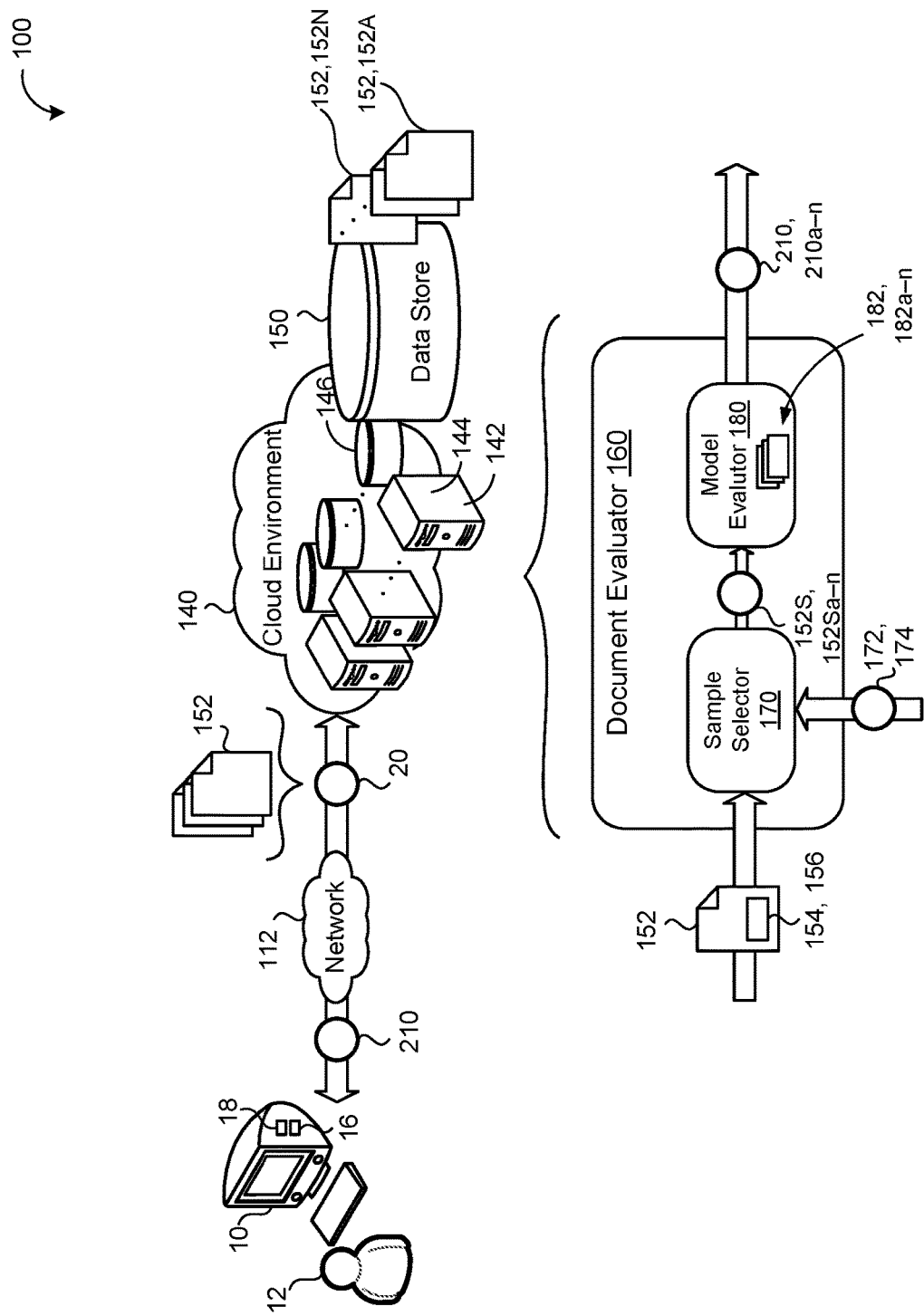
FIG. 1 is a schematic view of an example system for providing an informative user interface for document recognizer training.

Referring to FIG. 1, in some implementations, an example document entity extraction system 100 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 is configured to store a set of documents 152, 152a-n. The documents 152 may be of any type and from any source (e.g., from the user, other remote entities, or generated by the remote system 140).

The remote system 140 is configured to receive an annotated document evaluation request 20 from a user device 10 associated with a respective user 12 via, for example, the network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The request 20 may include one or more annotated documents 152 for evaluation. Additionally or alternatively, the request 20 may refer to one or more documents 152 stored at the data store 150 (or other third party location) for evaluation.

In some implementations, each annotated document 152 includes one or more entities 154. The entities 154 may be referred to interchangeably with the term fields 154. Each respective field 154 of the annotated document 152 is labeled by a respective annotation 156. Optionally, the annotations are generated by the user 12. In some examples, the annotations 156 annotate or label the values of key-value pairs included within the annotated document 152 and do not label the key. As discussed in more detail below, each annotation 156 includes, for example, a tag to represent the key and a bounding box to annotate the value of the key. The annotations 156 represent instructions or examples for an entity extraction model to use to learn to optimally extract entities or fields from documents.

The annotations 156 may be separable from the document. For example, the annotations 156 may be metadata attached to or associated with the respective document 152. For example, the user 12 provides, via the user device 10, an unannotated document to the document evaluator 160 and then provides the annotations via a graphical user interface executing on the user device 10 (and in communication with the document evaluator 160), such as by drawing bounding boxes and entering labels into text fields or the like. The annotations 156 may be saved as separate metadata such that the annotated documents 152 may be evaluated with or without the annotations 156 present.

In some implementations, the remote system 140 executes a document evaluator 160 for evaluating the annotated documents 152. In other implementations, the user device 10 executes the document evaluator 160. In yet other implementations, a portion of the document evaluator 160 executes on the user device 10 and a portion of the document evaluator 160 executes on the remote system 140. The document evaluator 160 includes a sample selector 200 that receives the annotated documents 152. The sample selector 200, in some implementations, for a threshold number of iterations 172, randomly selects a selection quantity 174 of annotated documents 152 for a respective subset of annotated documents 152, 152S, 152Sa-n. For example, when the threshold number of iterations 172 is ten and the selection quantity 174 is five, the sample selector 200, ten separate times, randomly selects five annotated documents 152 for a subset of annotated documents 152S. The number of iterations 172 may be any number and the selection quantity 174 may be any number less than the number of annotated documents 152 provided to the sample selector 200. In some implementations, the user 12 provides the number of iterations 172 and/or the selection quantity 174 (e.g., via the request 20). That is, the quantity of annotated documents 152 in each subset of annotated documents 152S and/or the quantity of subsets of annotated documents 152S is user-configurable. In other implementations, the number of iterations 172 and/or the selection quantity 174 is fixed or determined based on the annotated documents 152 provided to the sample selector 200 (e.g., based on a quantity of annotated documents 152 provided to the sample selector 200). The sample selector 200 provides each subset of annotated documents 152S to a model evaluator 180.

The model evaluator 180, for each respective subset of annotated documents 152S, trains a different evaluation model 182, 182a-n for the respective subset of annotated documents 152S. For example, when the threshold number of iterations 172 is ten and the selection quantity 174 is five, the sample selector 200 provides ten different subsets of annotated documents 152S (each with five annotated documents 152) to the model evaluator 180 and the model evaluator 180 trains ten different evaluation models 182 with each evaluation model 182 trained on one of the subsets of annotated documents 152S. In these examples, the quantity of annotated documents 152 in each respective subset of annotated documents 152S is the same.

The model evaluator 180, for each respective evaluation model 182, generates a respective evaluation 210, 210a-n for the respective evaluation model 182. Each evaluation 210 may include a quantification of a quality of the respective model 182. Optionally, the evaluations 210 include one or more of an accuracy of the respective model 182, a precision of the respective model 182, a recall sensitivity of the respective model 182, a specificity of the respective model 182, and/or an $F_1$ score of the respective model 182. The $F_1$ score is the harmonic mean of the precision and recall of the respective model 182. The document evaluator 160 provides the evaluations 210 to the user device 10 (e.g., via the network 112). The evaluations 210 may be configured to cause the user device 10 to display (e.g., on a graphical user interface (GUI) executing on the user device 10) the evaluations 210 for viewing by the user 12.

Figure 2A:
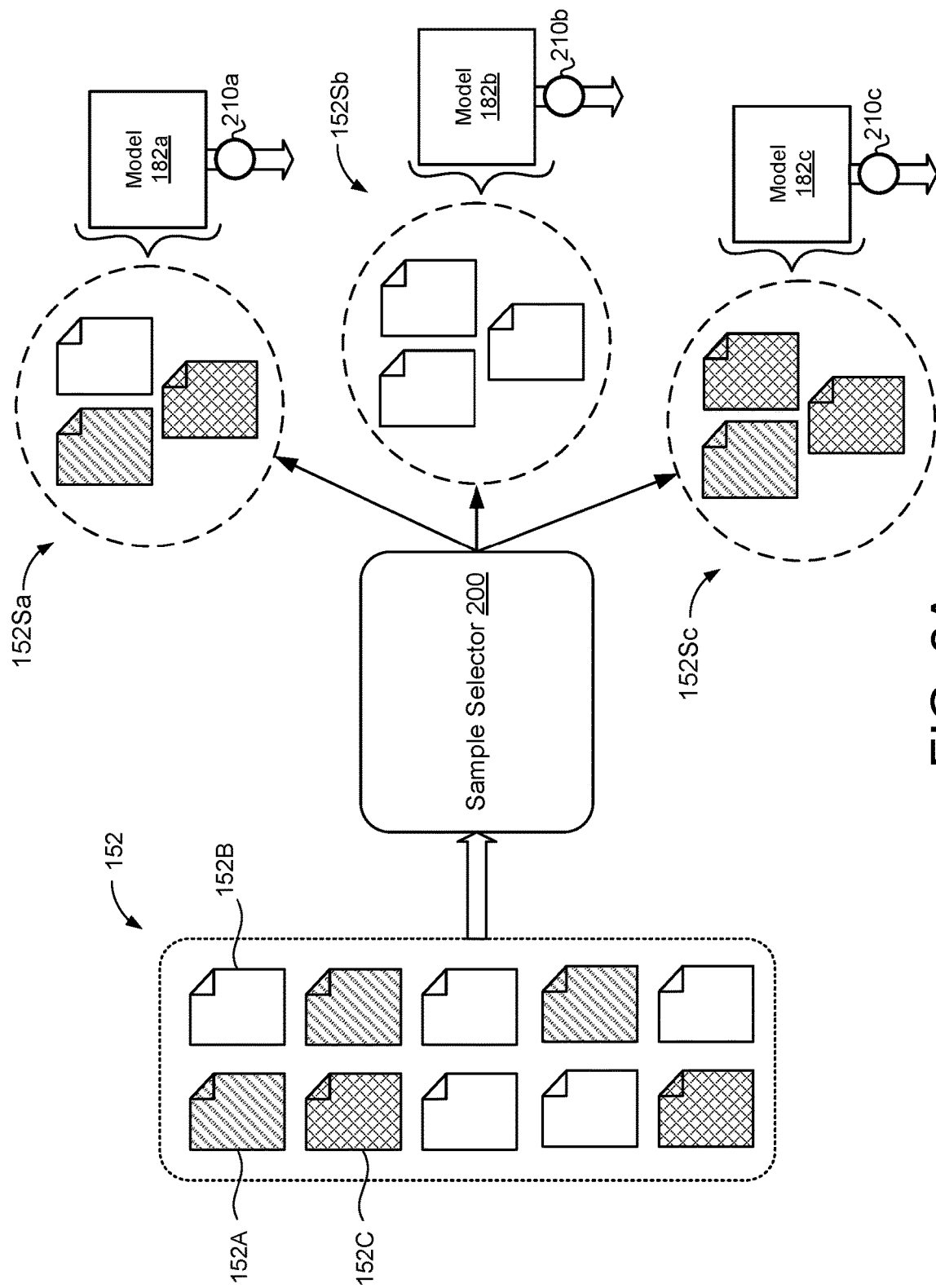
FIGS. 2A and 2B are schematic views of exemplary sample selector and evaluations of annotated documents.

Referring now to FIG. 2A, the sample selector 200 may receive any number of annotated documents 152. In this example, the sample selector 200 receives ten annotated documents 152 (e.g., from the user 12). The sample selector 200 randomly selects from the received annotated documents 152 for the subsets of annotated documents 152S. Here, the sample selector 200 selects three annotated documents 152 (i.e., the selection quantity 174) three times (i.e., the number of iterations 172) to form a first subset of annotated documents 152S, 152Sa, a second subset of annotated documents 152S, 152Sb, and a third subset of annotated documents 152S, 152Sc.

The model evaluator 180 (FIG. 1) trains a model 182 using each respective subset of annotated documents 152S. In this example, the model evaluator 180 trains a first model 182a using the first subset of annotated documents 152Sa, a second model 182a using the second subset of annotated documents 152Sb, and a third model 182c using the third subset of annotated documents 152Sc. The model evaluator 180 may evaluate each respective model 182 using the other annotated documents 152 that were not used to train the respective model 182. For example, the model evaluator 180 trains the first model 182a using the first subset of annotated documents 152Sa and evaluates the first model 182a using the second subset of annotated documents 152Sb and the third subset of annotated documents 152Sc. Similarly, the model evaluator 180 trains the second model 182b using the second subset of annotated documents 152Sb and evaluates the second model 182b using the first subset of annotated documents 152Sa and the third subset of annotated documents 152Sc. The model evaluator 180 may evaluate a respective model 182 by providing the documents 152 to the respective model 182 without the annotations 156 and then compare the predictions or output of the respective model 182 to the annotations 156 (e.g., determine a loss between the prediction generated by the respective model 182 and the annotations 156).

In some scenarios, the sample selector 200 is provided annotated documents 152 of various quality and/or formatting. For example, even when all of the annotated documents 152 provided to the sample selector 200 are the same form (e.g., a W-2 tax form), a portion of the annotated documents 152 may be scanned copies, others may be photographs, and yet others may be electronic copies of the form. That is, it is common for users 12 to provide annotated documents 152 as training samples for a document extraction model that have variations. These variations often negatively impact the training and performance of the document extraction model, however the user 12 lacks the feedback necessary to curate the provided annotated documents 152 in a manner that improves training. By randomly selecting multiple different subsets of annotated documents 152S, the document evaluator 160 may reveal these variations in order to provide meaningful and substantive feedback to the user regarding the quality of the training samples provided.

In the example of FIG. 2A, the annotated documents 152 include a first variation 152, 152A, a second variation 152, 152B, and a third variation 152, 152C. By randomly selecting the subsets of annotated documents 152, the first subset of annotated documents 152Sa includes one of each variations 152A-C, while the second subset of annotated documents 152Sb includes only the second variation 152B. The third subset of annotated documents 152Sb includes one of the first variation 152A and two of the third variation 152C. The model evaluator 180 generates evaluations 210a-c that reflect or represent a quality of the models 182a-c trained using the respective subsets of annotated documents 152Sa-c (including whatever variations the subsets of annotated documents 152S included).

Figure 2B:
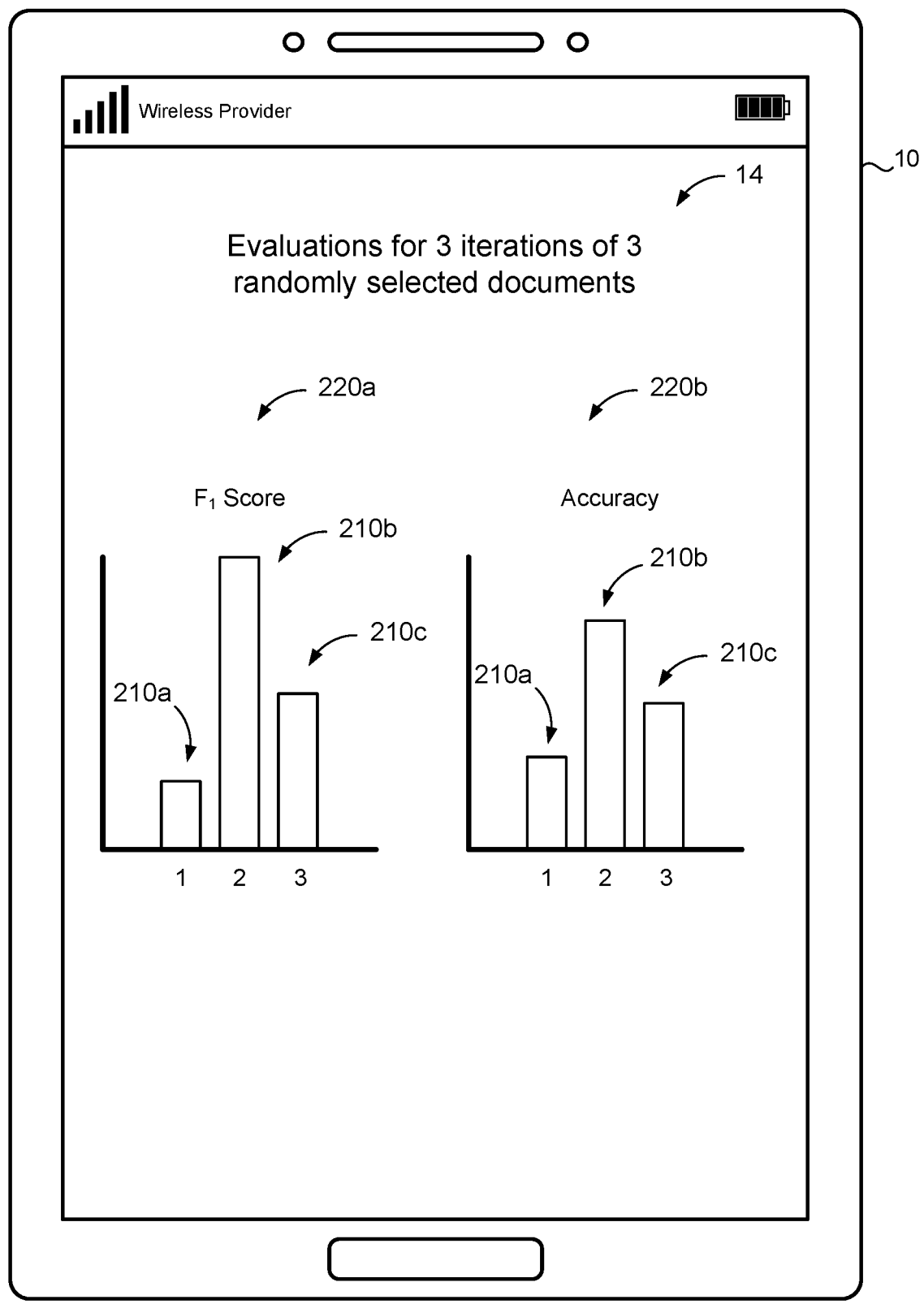

Referring now to FIG. 2B, a user device 10 executes a GUI 14 that displays at least a portion of the evaluations 210 for the user 12 to view. The evaluations 210 may take any number of forms, such as tables, plots, graphs, etc. In some examples, the evaluations 210 are presented in a manner allowing comparison between the different evaluations 210. In the example of FIG. 2B, the evaluations 210 are represented using a first bar graph 220a and a second bar graph 220b. The first bar graph 220a graphs the $F_1$ score of each evaluation 210a-c while the second bar graph 220b graphs the accuracy of each evaluation 210a-c. Each evaluation 210 may include any number of parameters describing or quantifying the respective model 182 (and thus, the respective subset of annotated documents 152S). Each evaluation 210, in some implementations, includes representations of the annotated documents 152S used to train the respective model 182. In some implementations, the GUI 14 displays (e.g., in response to a user interaction) the annotated documents 152S that were used to train the respective model 182, thus allowing the user 12 to easily correlate the annotated documents 152 used to train the model 182 with the metrics provided by the evaluation 210. For example, the user selects a link or uses any other user input (e.g., a button, a voice command, etc.) to view the annotated documents 152 associated with a particular evaluation 210. While this example represents the evaluations 210 as bar graphs, the evaluations 210 may be represented with any other number of forms (e.g., scatter plots).

In this example, it is apparent from the first graph 220a and the second graph 220b that the second model 182b represented by the second evaluation 210b is of the highest quality (i.e., by having the highest $F_1$ score and the highest accuracy) while both the first model 182a and the third model 182c lag behind substantially. The user 12 may review the evaluation 210b to determine that the second model 182 was trained using only the second variation 152B of annotated documents 152. This provides the user 12 with information relating to the quality and effectiveness of the different variations 152A-C. For example, the user 12, in response to the evaluations 210a-c, removes the documents of the first variation 152A and the documents of the third variation 152C and/or adds additional documents of the second variation 152B.

Optionally, in addition to the evaluations 210 or as an alternative to the evaluations 210, the document evaluator 160 provides, to the user device 10, an aggregation of the quality of each respective mode 182. For example, the document evaluator 160 provides an average and/or a standard deviation or other metric of the $F_1$ score, the accuracy, the recall, or any other metric of the models 182. The evaluations 210 and/or the aggregation may provide a simple and clear indication of an overall quality of the provided annotated documents 152. For example, when the evaluations 210 indicate that each model 182 has a similar quality, this is an indication that the annotated documents 152 do not include substantive variations. When the evaluations 210 indicate there is little variation among the annotated documents 152 and the resulting quality of each model 182 is high, the user 12 may have the appropriate training samples to train the final document extraction model. However, when the evaluations 210 indicate variations among the annotated documents 152 (e.g., some models 182 perform well while other models 182 do not perform well), the user 12 may desire to curate the set of annotated documents by adding and/or removing annotated documents 152 to reduce variations.

In some examples, the document evaluator 160 provides one or more recommendations to the user device 10 for curating the annotated documents 152. Optionally, the document evaluator 160 recommends annotated documents 152 that are ideal examples (based on the evaluations 210) for training the document extraction model and/or annotated documents 152 that should be considered being removed. For example, based on the evaluations 210, the document evaluator 210 determines that three of the worst-performing models 182 each include a specific annotated document 152 and the document evaluator 160 recommends to the user 12 that the specific annotated document 152 is removed from consideration. In some examples, the document evaluator 160 automatically trains the final document extraction model based on the evaluations 210. For example, the document evaluator 160 selects, from the provided annotated documents, a subset of annotated documents 152S, based on the evaluations 210, and trains the final model using the selected subset of annotated documents 152S.

Figure 3A:
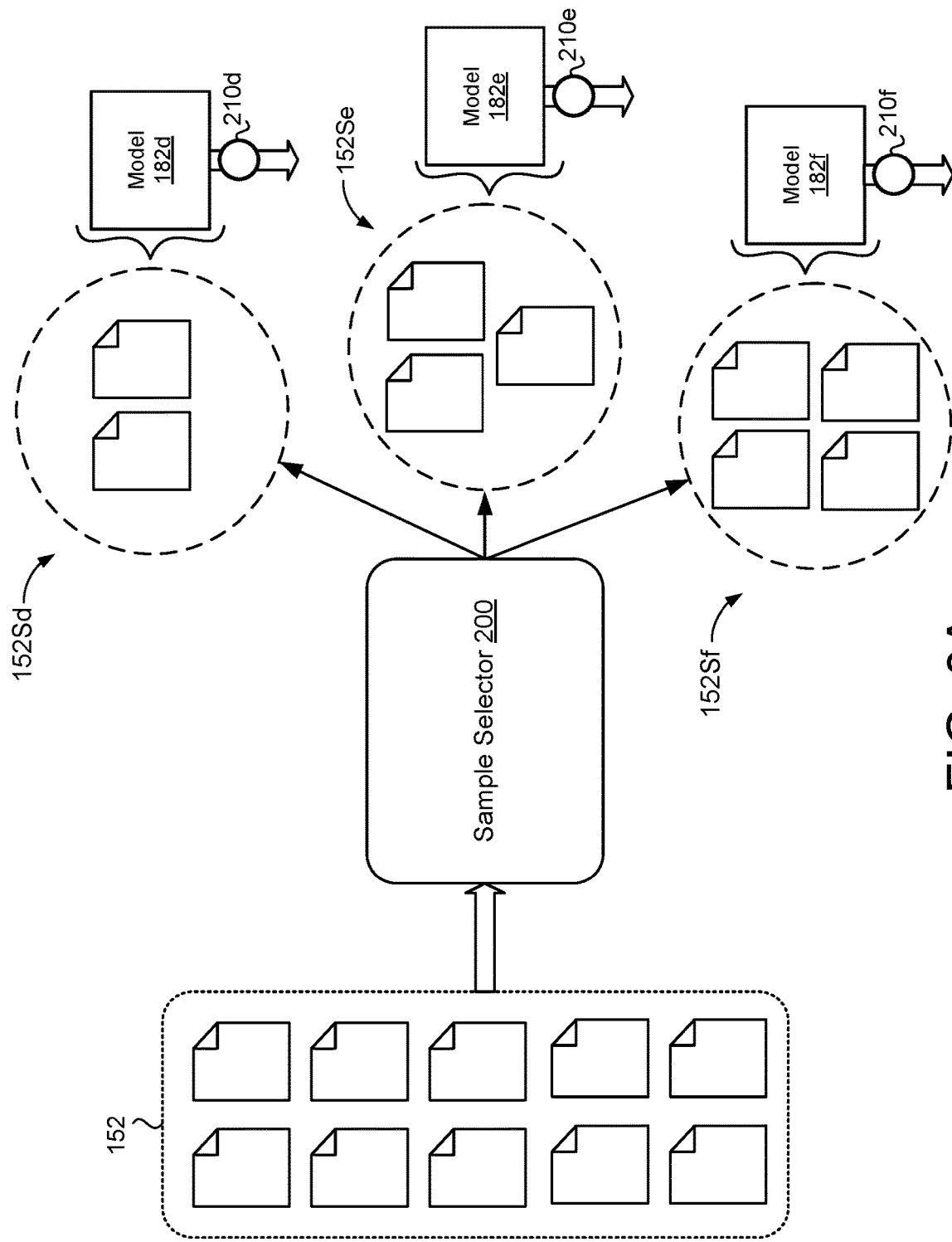
FIGS. 3A and 3B are schematic views of another exemplary sample selector and evaluations of additional annotated documents.

Referring now to FIG. 3A, in some implementations, the document evaluator 160 provides, to the user device 10, a predicted evaluation for a quantity of annotated documents that exceeds the quantity of annotated documents provided to the document evaluator 160. For example, when the user device 10 provides the document evaluator 160 with ten annotated documents 152, the document evaluator 160 predicts or determines or an effect providing additional annotated documents 152 (e.g., fifteen annotated documents 152 or twenty annotated documents 152) would have on the quality of the final trained document extraction model. To this end, in some examples, the sample selector 200 varies the quantity of annotated documents 152 in two or more subsets of annotated documents 152S. The model evaluator 180 may evaluate the quality of each model 182 trained on different the different quantities of annotated documents 152 and predict the quality of a model 182 trained on more annotated documents 152 than provided to the document evaluator 160. In the example of FIG. 3A, the sample selector selects two annotated documents 152 for a first subset of annotated documents 152Sd, three annotated documents 152 for a second subset of annotated documents 152Se, and four annotated documents 152 for a third subset of annotated documents 152Sf. Using these subsets of annotated documents 152Sd-f, the model evaluator 180 generates corresponding models 182d-f and evaluations 210d-f.

Figure 3B:
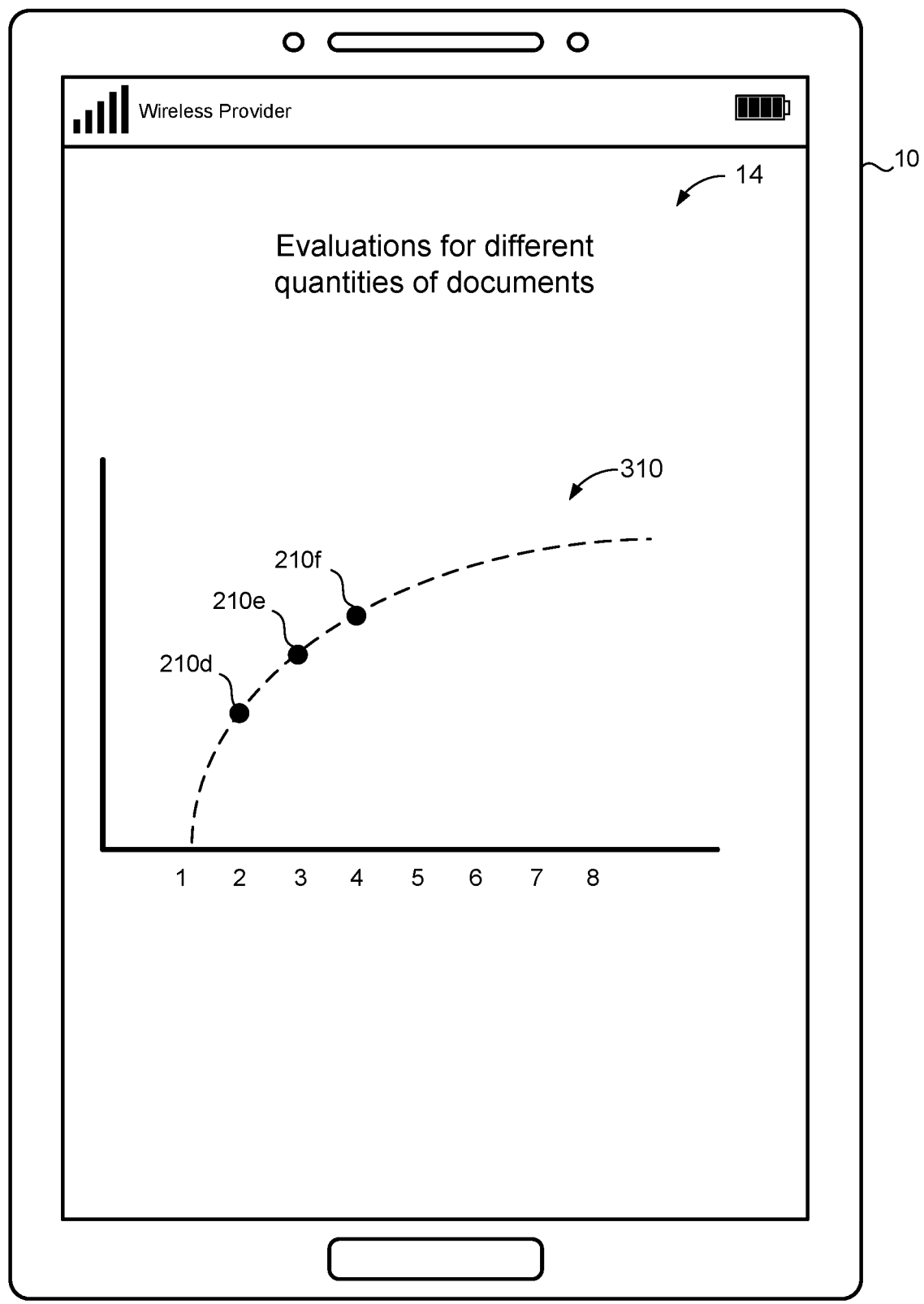

Referring now to FIG. 3B, in some implementations, the document evaluator 160 plots (e.g., using a scatter plot) the quality of each model 182 and fits a line or curve to the data points. Here, the user device 10 executes the GUI 14 that displays a scatter plot with data points from each of the evaluations 210d-f. In this example, the relative quality of the respective model 182 increases as the quantity of documents 152 used to train the model increases. A curve fit 310 allows the user to estimate the quality of models 182 trained using additional annotated documents 152 (i.e., five through eight annotated documents 152 in this example). The document evaluator 160 and/or the user device 10 generate the plot and the curve fit 310 from the evaluations 210 evaluating the quality of the models 182. The plot may include one or more of an accuracy of each respective evaluation model 182, an $F_1$ score of each respective evaluation model 182, a precision of each respective evaluation model 182, or a recall of each respective evaluation model 182.

Thus, the document evaluator 160 receives requests 20 from, for example, a user device 10 to determine a quality or variability of a set of annotated documents 152 and/or to predict improvements in model efficacy based on additional training samples (i.e., annotated documents). The request 20 may request the document evaluator 160 to perform either or both evaluations. The sample selector 200 selects subsets of annotated documents 152S that each include the same quantity of annotated documents 152S to quantify or evaluate the quality of the provided annotated documents 152. In contrast, the sample selector 200 selects subsets of annotated documents 152S that include different quantities of annotated documents 152S to predict or estimate an effect additional annotated documents 152 may have on model quality. The document evaluator 160 provides valuable feedback to the user 12 on the quality of the training samples prior to committing the resources to training the full document extraction model.

Figure 4:
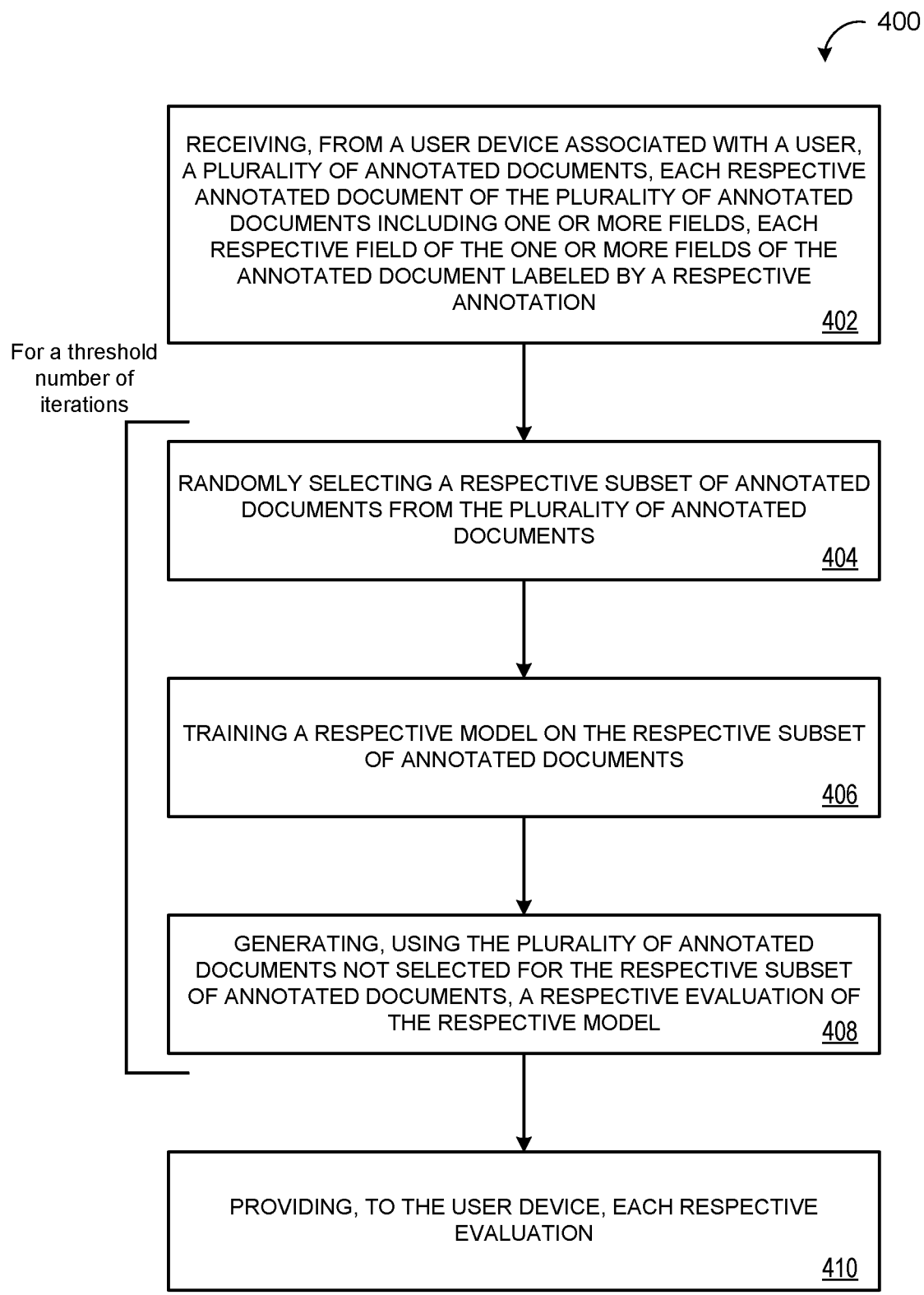
FIG. 4 a flowchart of an example arrangement of operations for a method of providing an informative user interface for document recognizer training.

FIG. 4 is a flowchart of an exemplary arrangement of operations for a method 400 for providing an informative user interface for document recognizer training. The computer-implemented method 400, executed by data processing hardware 144, causes the data processing hardware 144 to perform operations. The method 400, at operation 402, includes receiving, from a user device 10 associated with a user 12, a plurality of annotated documents 152. Each respective annotated document 152 of the plurality of annotated documents 152 includes one or more fields 154. Each respective field 154 of the one or more fields 154 of the annotated document is labeled by a respective annotation 156. For a threshold number of iterations 172, the method 400, at operation 404, includes randomly selecting a respective subset of annotated documents 152S from the plurality of annotated documents 152. At operation 406, the method 400 includes training a respective model 182 on the respective subset of annotated documents 152. At operation 408, the method 400 includes generating, using the plurality of annotated documents 152 not selected for the respective subset of annotated documents 152S, a respective evaluation 210 of the respective model 182. The method 400, at operation 410, includes providing, to the user device 10, each respective evaluation 210.

Figure 5:
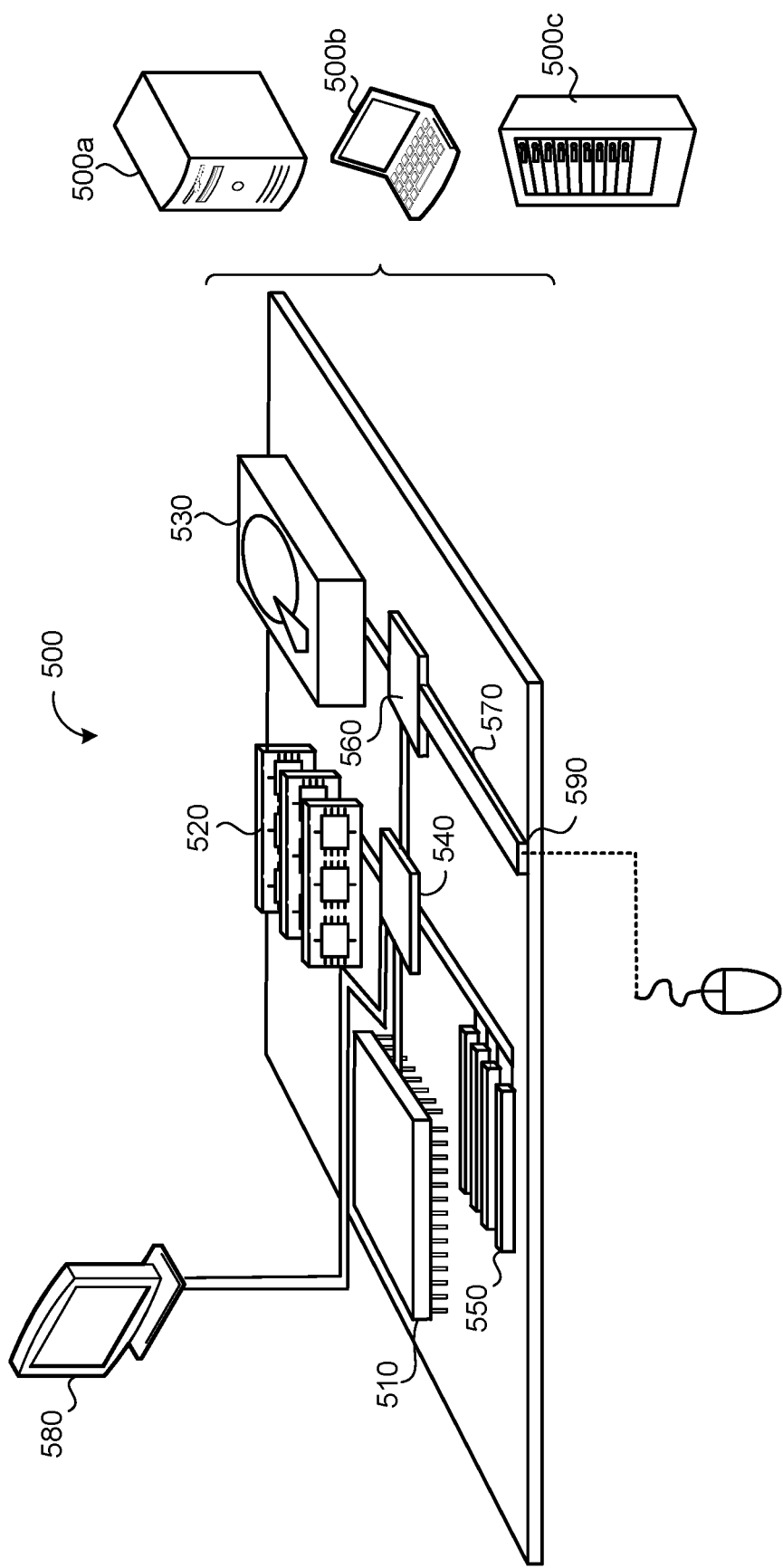
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   receiving, from a user device associated with a user, a plurality of annotated documents, each respective annotated document of the plurality of annotated documents comprising one or more fields, each respective field of the one or more fields of the respective annotated document labeled by a respective annotation;
   for a threshold number of iterations:
      randomly selecting a respective subset of annotated documents from the plurality of annotated documents;
      training a respective model on the respective subset of annotated documents;
      processing, using the respective model, remaining annotated documents of the plurality of annotated documents not selected for the respective subset of annotated documents; and
      evaluating a characteristic of the respective model based on the processing to generate a respective evaluation; and
      modifying the plurality of annotated documents based on the respective evaluation of the respective model; and
   providing, to the user device, each respective evaluation.

2. The method of claim 1, wherein:
   each respective evaluation comprises a quantification of a quality of the respective model; and
   the operations further comprise providing, to the user device, an aggregation of the quality of each respective model.

3. The method of claim 2, wherein the aggregation comprises an average or a standard deviation of the quality.

4. The method of claim 1, wherein a quantity of annotated documents in each respective subset of annotated documents is the same.

5. The method of claim 4, wherein the quantity of annotated documents is configurable by the user device.

6. The method of claim 1, wherein a quantity of annotated documents in a first respective subset of annotated documents is different from a quantity of annotated documents in a second respective subset of annotated documents.

7. The method of claim 6, wherein the operations further comprise providing, to the user device, a predicted evaluation for a quantity of annotated documents that exceeds a quantity of the plurality of annotated documents.

8. The method of claim 1, wherein the threshold number of iterations is configurable by the user device.

9. The method of claim 1, wherein providing each respective evaluation comprises: generating, using each respective evaluation, a scatter plot; and providing, to the user device, the scatter plot.

10. The method of claim 9, wherein the scatter plot comprises one or more of:
    an accuracy of each respective model;
    an F1 score of each respective model;
    a precision of each respective model; or
    a recall of each respective model.

11. The method of claim 9, wherein generating the scatter plot comprises fitting a curve to the scatter plot, the curve indicating an additional quantity of annotated samples for the user device to provide.

12. The method of claim 1, wherein modifying the plurality of annotated documents comprises at least one of: (i) removing at least one document from the plurality of annotated documents or (ii) adding at least one document to the plurality of annotated documents.

13. A system comprising:
    data processing hardware; and
    memory hardware in communication with the data processing hardware, the memory hardware storing instructions that when executed on the data processing hardware cause the data processing hardware to perform operations comprising:

receiving, from a user device associated with a user, a plurality of annotated documents, each respective annotated document of the plurality of annotated documents comprising one or more fields, each respective field of the one or more fields of the respective annotated document labeled by a respective annotation;

for a threshold number of iterations:
- randomly selecting a respective subset of annotated documents from the plurality of annotated documents;
- training a respective model on the respective subset of annotated documents;
- processing, using the respective model, remaining annotated documents of the plurality of annotated documents not selected for the respective subset of annotated documents; and
- evaluating a characteristic of the respective model based on the processing to generate a respective evaluation; and
- modifying the plurality of annotated documents based on the respective evaluation of the respective model; and providing, to the user device, each respective evaluation.

14. The system of claim 13, wherein:
each respective evaluation comprises a quantification of a quality of the respective model; and
the operations further comprise providing, to the user device, an aggregation of the quality of each respective model.

15. The system of claim 14, wherein the aggregation comprises an average or a standard deviation of the quality.

16. The system of claim 13, wherein a quantity of annotated documents in each respective subset of annotated documents is the same.

17. The system of claim 16, wherein the quantity of annotated documents is configurable by the user device.

18. The system of claim 13, wherein a quantity of annotated documents in a first respective subset of annotated documents is different from a quantity of annotated documents in a second respective subset of annotated documents.

19. The system of claim 13, wherein the operations further comprise providing, to the user device, a predicted evaluation for a quantity of annotated documents that exceeds a quantity of the plurality of annotated documents.

20. The system of claim 13, wherein providing each respective evaluation comprises:
generating, using each respective evaluation, a scatter plot; and
providing, to the user device, the scatter plot.

21. The system of claim 20, wherein the scatter plot comprises one or more of:
an accuracy of each respective model;
an F1 score of each respective model;
a precision of each respective model; or
a recall of each respective model.

22. The system of claim 20, wherein generating the scatter plot comprises fitting a curve to the scatter plot, the curve indicating an additional quantity of annotated samples for the user device to provide.

* * * * *